United States Patent [19]

Nakamura

[11] Patent Number: 5,205,522
[45] Date of Patent: Apr. 27, 1993

[54] STAND APPARATUS FOR MEDICAL OPTICAL INSTRUMENT

[75] Inventor: Katsushige Nakamura, Tokyo, Japan

[73] Assignee: Kesanori Sahara, Tokyo, Japan

[21] Appl. No.: 889,223

[22] Filed: May 27, 1992

[30] Foreign Application Priority Data

Dec. 25, 1991 [JP] Japan .................. 3-342577

[51] Int. Cl.⁵ .............................................. F16L 3/00
[52] U.S. Cl. .............................. 248/123.1; 248/281.1; 359/384
[58] Field of Search ............... 248/123.1, 280.1, 281.1, 248/585, 660; 359/384; 414/917

[56] References Cited

U.S. PATENT DOCUMENTS

| | | | |
|---|---|---|---|
| 2,967,458 | 1/1961 | Stone, Jr. | 359/384 X |
| 3,475,075 | 10/1969 | Stone, Jr. | 359/384 |
| 3,762,796 | 10/1973 | Heller | 359/384 X |
| 3,762,797 | 10/1973 | Heller | 359/384 X |
| 3,809,454 | 5/1974 | Brambring | 359/384 X |
| 3,891,301 | 6/1975 | Heller | 359/384 |
| 4,684,088 | 8/1987 | Heller | 414/917 X |
| 4,741,607 | 5/1988 | Heller | 359/384 |
| 4,867,405 | 9/1989 | Nakamura | 248/123.1 X |
| 4,881,709 | 11/1989 | Nakamura | 248/123.1 X |

*Primary Examiner*—Ramon O. Ramirez
*Attorney, Agent, or Firm*—Jordan and Hamburg

[57] ABSTRACT

The invention provides a stand apparatus for a medical optical instrument, in which a rear-side parallel link mechanism and a counterweight are arranged below those of a conventional arrangement.

The rear-side parallel link mechanism having the counterweight is arranged below that of the conventional arrangement, and operation of a front-side parallel link mechanism is transmitted to the rear-side parallel link mechanism through a transmission mechanism. Accordingly, a weight balance of the medical optical instrument is surely tried by the counterweight similarly to the conventional arrangement. Further, an upper rear space, which has conventionally been occupied by the rear-side parallel link mechanism, can freely be used by an operator and an assistant and, therefore, this becomes very convenient. Furthermore, a position of the center of gravity of the entire stand apparatus is lowered considerably, and stability of the stand apparatus increases.

2 Claims, 4 Drawing Sheets

STAND APPARATUS FOR MEDICAL OPTICAL INSTRUMENT

BACKGROUND OF THE INVENTION

1. Field of the Invention

The present invention relates to stand apparatuses for medical optical instruments and, more particularly, to a stand apparatus for medical optical instrument, which is particularly low in center of gravity and in which an attempt can be made to effectively utilize an upper space.

2. Description of the Prior Art

Local operation of an affected or diseased part in cerebral surgical operation and heart surgical operation is executed while observing the affected part by an operation microscope which serves as "Medical Optical Instrument", and is generally called "microsurgery". Operation of this kind or type is difficult among various operations, and there are many cases where operation time is lengthened. It is not preferable for a patient and a doctor or a physician, however, that the operation time is lengthened in this manner, because a fatigue increases bodily and mentally. Accordingly, a social demand or request increases more and more in which an attempt can be made to reduce or shorten such operation time.

The medical optical instrument such as the operation microscope or the like performs extremely large duties in such high operation. In fact, it is said that easiness of the use of the medical optical instrument is linked to shortening of the operation time as it is.

That is, it becomes a very important point in an attempt to shorten the operation time how an operator can accurately and speedily or rapidly position the medical optical instrument to a desired objective point (target affected part), and that the once fixed objective point does not shift during operation. In view of this, although the easiness of the use of the medical optical instrument is said, a problem results from, rather than the performance of the medical optical instrument per se, after all, operability of a stand apparatus which supports the medical optical instrument.

In view of the above, an inventor of the present application has provided, until now, a stand apparatus superior in operability, which can contribute to shortening of the operation time (refer to Japanese Patent Laid-Open No. SHO 64-56409, i.e. U.S. Pat. No. 4,881,709). FIG. 5 and 6 of the attached drawings are views showing an example of a conventional stand apparatus of the kind referred to above. In this connection, as a directionality in the drawings, the reference character A denotes a front side; B, a rear side; C, a left-hand side; D, a right-hand side; E, an upper side; and F, a lower side.

The stand apparatus comprises a front-side parallel link mechanism 2 supporting an operation microscope 1, a rear-side parallel link mechanism 3 supporting a counterweight W, and a supporting body 4 supporting both the front- and rear-side parallel link mechanisms 2 and 3. FIG. 5 is an outer appearance view showing an entire arrangement of the stand apparatus, while FIG. 6 is a diagram showing only the front- and rear-side parallel link mechanisms 2 and 3 of the stand apparatus. The conventional stand apparatus will hereunder be described on the basis of FIG. 6 which is easy to be understood in structure or construction and operation.

A central portion between the front-side parallel link mechanism 2 and the rear-side parallel link mechanism 3 is a center shaft S1. The center shaft S1 is supported by a bearing section 5 which is supported at a predetermined height position by first and second horizontal arms 6 and 7 of the support body 4. The center shaft S1 can execute rotational or angularly moving operation about an axis $a1$, and can also execute seesaw operation (both front and rear ends being swingable upwardly and downwardly) about an axis $a2$ of the bearing section 5.

Further, a longitudinal frame T is supported for angular movement about an attaching point 8 at a location in the neighborhood of the bearing section 5 of the center shaft S1. A portion of the center shaft S1 in front of the attaching point 8 and an upper portion of the longitudinal frame T are utilized to form the front-side parallel link mechanism (parallelogrammatic link structure or construction) 2, while a portion of the center shaft S1 in rear of the attaching point 8 and a lower portion of the longitudinal frame T are utilized to form the rear-side parallel link mechanism (parallelogrammatic link construction) 3. The operation microscope 1 that is a supporting object is supported at a forward end of the front-side parallel link mechanism 2. Provided on the rear-side parallel link mechanism 3 is the counterweight W which keeps a weight balance with respect to the operation microscope 1. In this connection, a curved section $2a$, which is provided on the front-side parallel link mechanism 2, is provided for avoiding an interference between the front-side parallel link mechanism 2 and a head of an operator which operates the operation microscope 1.

In order to change or alter an observation angle due to the operation microscope 1, each of the front-side parallel link mechanism 2 and the rear-side parallel link mechanism 3 is capable of being inclined or tilted longitudinally about the attaching point 8. That is, as shown in FIG. 6, about the attaching point 8, the front-side link mechanism 2 can be tilted to a forward side, while the rear-side parallel link mechanism 3 can be tilted to a rear side. Accordingly, the operation microscope 1 can be positioned to every locations by rotational or angularly moving operation of the center shaft S1 about the axis $a1$, longitudinal tilting operation of the front- and rear-side parallel link mechanisms 2 and 3, and seesaw operation of the center shaft S1 about the axis $a2$. Furthermore, since a focal point f of the operation microscope 1 is located on the axis $a1$ which serves an extension line of the center shaft S1, even if the observation angle of the operation microscope 1 changes, an observation point is immovable.

In the conventional stand apparatus for the medical optical instrument constructed as described above, as described previously, the counterweight W, which is provided on the rear-side parallel link mechanism 3, becomes an extremely heavy article, to keep a weight balance between both the operation microscope 1 and the front-side parallel link mechanism 2. Since the counterweight W per se, which serves as the heavy weight article, largely moves longitudinally, laterally, or the like, a considerable space is required in the neighborhood of, particularly, the rear-side parallel link mechanism 3. Moreover, since both the front-side parallel link mechanism 2 and the rear-side parallel link mechanism 3 are supported at their respective predetermined height positions by the support body 4, the rear-side parallel link mechanism 3 per se, on which the counterweight W is provided, is located at a certain height position.

However, a part space upper than the height position, at which the rear-side parallel link mechanism 3 is located, is an important space for the operator and an assistant or helper. It is very inconvenience for the operator or like the that the space is occupied as a moving space of the rear-side parallel link mechanism 3 so that the space cannot be used freely. Further, it is not preferable from the viewpoint of stability of the entire stand apparatus that the heavy counterweight W moves longitudinally and laterally at the higher position.

SUMMARY OF THE INVENTION

This invention has been done in view of the above-described prior art, and it is an object of the invention to provide a stand apparatus for a medical optical instrument, in which a rear-side parallel link mechanism having provided thereon a counterweight is arranged lower than that of the prior art.

A stand apparatus for a medical optical instrument, according to claim 1, will be described with reference to FIG. 1. The stand apparatus comprises a center shaft S1 having an axis, an auxiliary center shaft S2 located at a position below the center shaft, a front-side parallel link mechanism 10 having the medical optical instrument 18 and located on fulcrums U1, U2, a rear-side parallel link mechanism 11 having a counterweight W, the center shaft S1 being provided with the front-side parallel link mechanism 10, the auxiliary center shaft S2 being provided with the rear-side parallel link mechanism 11, and a transmission mechanism 13 having a first system and a second system, wherein angularly moving operation of the center shaft S1 about the axis and longitudinal tilting operation (in a direction indicated by arrows A and B of the front-side parallel link mechanism 10 about the fulcrums U1, U2 are capable of being transmitted respectively to the auxiliary center shaft S2 and to the rear-side parallel link mechanism 11, through the first system and the second system of the transmission mechanism 13.

A stand apparatus for the medical optical instrument, according to claim 2, is arranged such that the transmission mechanism 13 further has a third system, and that the transmission mechanism 13 transmits seesaw operation of the center shaft about an axis ($\alpha 2$) to the auxiliary center shaft, through the third system.

According to the stand apparatus for the medical optical instrument, according to the present invention, operation of the front-side parallel link mechanism provided on the center shaft is surely or certainly transmitted to the lower auxiliary center shaft and the rear-side parallel link mechanism through the transmission mechanism. Accordingly, although the counterweight and the rear-side parallel link mechanism are arranged at the lower position in spaced relation away from the front-side parallel link mechanism, an attempt can be made at a weight balance of the medical optical instrument by the counterweight like the conventional arrangement.

Further, since the counterweight and the rear-side parallel link mechanism are arranged lower than those of the conventional arrangement, a rear space above the stand apparatus is not occupied by the counterweight and the rear-side parallel link mechanism as is in the conventional arrangement. An operator and an assistant can freely use the rear upper space, and this becomes very convenient. Furthermore, the position of the center of gravity of the stand apparatus is low considerably, and stability of the stand apparatus increases. Accordingly, if many accessories such as a camera, a video and the like are attached to the stand apparatus, a bad influence is not exerted upon stability of the stand apparatus.

DESCRIPTION OF THE PREFERRED EMBODIMENTS

Figure 1:
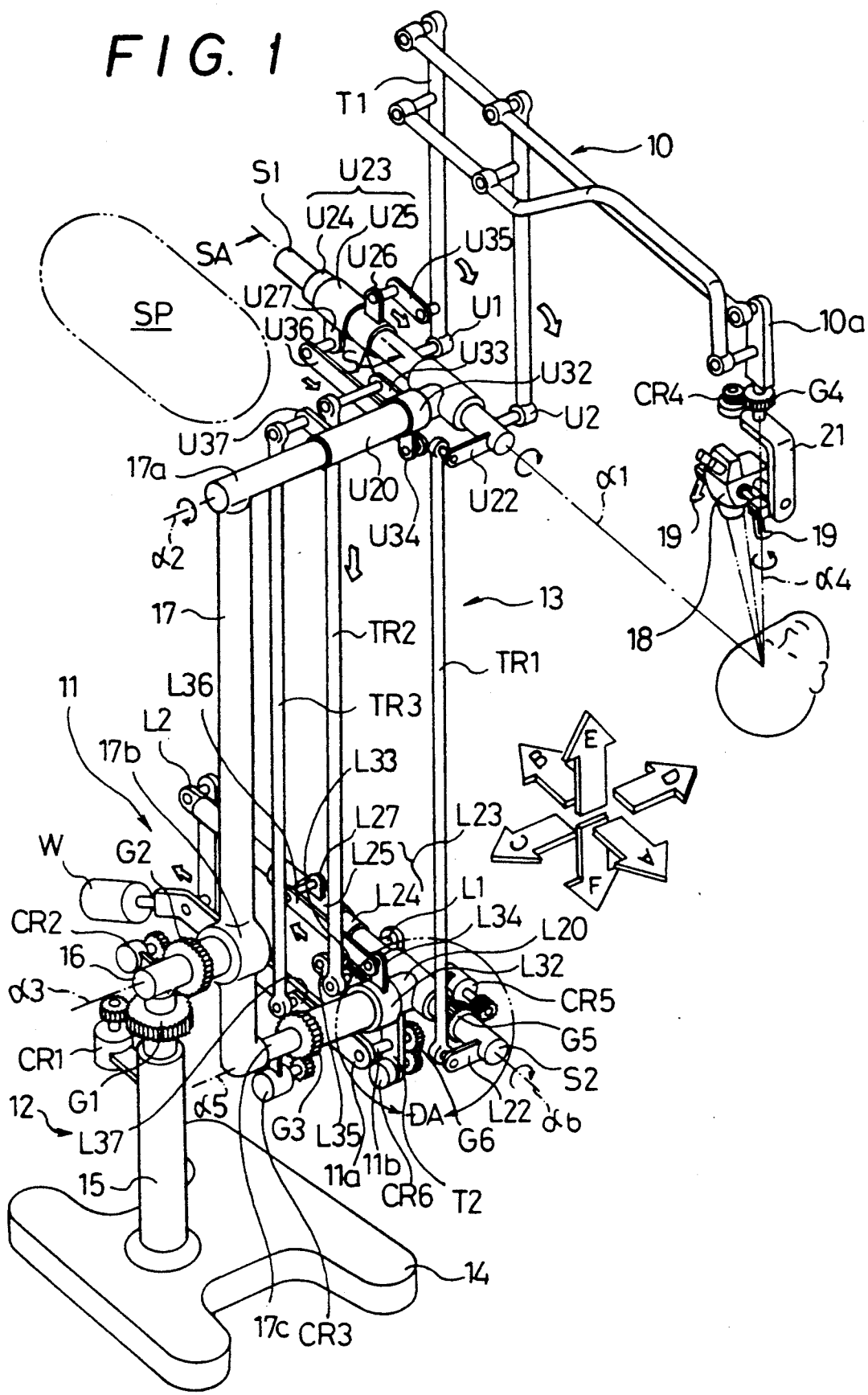
FIG. 1 is a view of an outer appearance showing an entire stand apparatus for medical optical instrument, according to an embodiment of the invention.

A preferred embodiment of the invention will hereunder be described with reference to FIGS. 1 through 4.

A stand apparatus according to the embodiment is largely divided into four (4) including a front-side parallel link mechanism 10, a rear-side parallel link mechanism 11, a support body 12, and a transmission mechanism 13. In this connection, as a directionality in the drawings, the reference character A denotes a front side; B, a rear side; C, a left-hand side; D, a right-hand side; E, an upper side; and F, a lower side.

The support body 12 is provided with a base section 14 generally in the form of H, a support post or a column 15 upstanding on the base section 14, a curved section 16 under a condition that a lower end of the curved section 16 is inserted into an upper end of the column 15, and a support frame 17 in the form of inverted C, under a condition that the other end of the curved section 16 is inserted into a halfway section 17b. Accordingly, the support frame 17 is rotatable or angularly movable about an axis $\alpha 3$. A gear G1 is integrally provided on a vertical portion of the curved section 16. The gear G1 and a gear of an electromagnetic clutch CR1 fixedly mounted on the column 15 are under a condition of being engaged with each other. Further, an electromagnetic clutch CR2 is fixedly mounted also on a horizontal portion of the curved section 16. A gear of the electromagnetic clutch CR2 and a gear G2 fixedly mounted on the halfway section 17b of the support frame 17 are engaged with each other. These electromagnetic clutches CR1 and CR2 and electromagnetic clutches CR3~CR6 to be described subsequently are so arranged as to obtain a clamp condition and a free condition by a switch which is provided on a handle 19 of an operation microscope 18. However, any of the electromagnetic clutches CR1~CR6 are brought to the free condition when energized, while any of the electromagnetic valves CR1~CR6 are brought to a mechanical clamp (lock condition) when de-energized. Even if an expected or accidental power stoppage or the like occurs, the condition of the stand apparatus can be maintained as it is.

That an upper horizontal section 17a of the support frame 17 is inserted in is a T-shaped bearing section U20 (U means Upper). An upper center shaft S1 is provided on the bearing section U20. Accordingly, the center shaft S1 is capable of executing seesaw operation about an axis $\alpha 2$ of the upper horizontal section 17a.

Provided on the center shaft S1 so as to be tiltable longitudinally about fulcrums U1 and U2 is the front-side parallel link mechanism (a parallelogrammatic structure 10. Further, a depending arm 21 is mounted on a front-end piece 10a of the front-side parallel link mechanism 10 so as to be movable angularly about an axis $\alpha 4$. Mounted on the depending arm 21 is the operation microscope 18 which serves as a "medical optical instrument". The electromagnetic clutch CR4 is fixedly mounted also on the depending arm 21. A gear of the electromagnetic clutch CR4 and a gear G4 fixedly mounted on the front-end piece 10a are under and engaged condition.

The transmission mechanism 13 which is located at an intermediate height will be described later, but the rear-side link mechanism 11 arranged at a lower position will be described. The support frame 17 has a lower horizontal section 17c which is inserted into a T-shaped bearing section L20 (L means Lower). An auxiliary center shaft S2 is provided on the bearing section L20. Accordingly, the auxiliary center shaft S2 is located just below the center shaft S1, and is capable of executing seesaw operation about an axis $\alpha 5$ of the lower-side horizontal section 17c, similarly to the upper-side center shaft S1. The rear-side parallel link mechanism (a parallelogrammatic structure) 11, which is tiltable longitudinally about fulcrums L1 and L2, is provided on the auxiliary center shaft S2. The rear-side parallel link mechanism 11 has a rear end on which a counterweight W is provided for keeping a balance with respect to the operation microscope 18. The auxiliary center shaft S2 has a front side on which a gear G5 is fixedly mounted. The gear G5 is engaged with a gear of the electromagnetic clutch CR5 which is fixedly mounted on the bearing section L20.

Here, the transmission mechanism 13 for transmitting operation of the center shaft S1 and operation of the rear-side parallel link mechanism 11 to the lower auxiliary center shaft S2 and to the rear-side parallel link mechanism 11 as they are will be described. The transmission mechanism 13 has three (3) systems. That is, a first system is a system for transmitting falling-down operation of the front-side parallel link mechanism 10, that is, rotational or angularly moving operation of the front-side parallel link mechanism 10 about the axis $\alpha 1$, to the rear-side parallel link mechanism 11, the cause to rear-side parallel link mechanism 11 to execute rotational or angularly moving operation in the same direction about an axis $\alpha 6$. A second system is a system for transmitting longitudinal tilting operation of the front-side parallel link mechanism 10 about the fulcrums U1 and U2, to the rear-side parallel link mechanism 11 to cause the rear-side parallel link mechanism 11 to execute longitudinal tilting operation in the opposite or reverse direction about the fulcrums L1 and L2. A third system is a system for transmitting seesaw operation of the center shaft S1 about the axis $\alpha 2$, to the lower auxiliary center shaft S2, to cause the auxiliary center shaft S2 to execute similar seesaw operation about the axis $\alpha 5$.

FIRST SYSTEM

As described previously, the first system is a system for transmitting rotational operation or angularly moving of the front-side parallel link mechanism 10 about the axis $\alpha 1$, to the rear-side parallel link mechanism 11, to cause the rear-side parallel link mechanism 11 to execute rotational or angularly moving operation in the same direction about the axis $\alpha 6$. That is, projecting pieces U22 and L22 are provided respectively on forward end portions of the respective center shaft S1 and auxiliary center shaft S2, and the projecting pieces U22 and L22 are connected to each other by a longitudinal link arm TR1. Accordingly, if, for example, the front-side parallel link mechanism 10 is fallen down toward the right (in a direction indicated by the arrow D), the center shaft S1 is angularly moved in the same direction about the axis $\alpha 1$, and the upper projecting piece U22 is angularly moved upwardly (in a direction indicated by the arrow E). Then, the longitudinal link arm TR1 is raised, whereby the lower projecting piece L22 is also pulled or tensioned upwardly (in the direction indicated by the arrow E) so that the auxiliary center shaft S2 begins to the moved angularly in a direction the same as that of the center shaft S1 about the axis $\alpha 6$, and the rear-side parallel link mechanism 11 moves angularly to the left (in the direction indicated by the arrow C) opposite to the front-side parallel link mechanism 10. In this manner, the rear-side parallel link mechanism 11 moves angularly in the direction opposite to the front-side parallel link mechanism 10, whereby a balance of the stand apparatus in the left-and right-hand directions is kept.

Second System

As described previously, the second system is a system of transmitting the longitudinal tilting operation of the front-side parallel link mechanism 10 about the fulcrums U1 and U2, to the rear-side parallel link mechanism 11, to cause the rear-side parallel link mechanism 11 to execute longitudinal tilting operation in the opposite direction about the fulcrums L1 and L2. Of the three systems, the second system is brought to the most complicated transmitting path and, therefore, void arrows are added into the drawings, showing the transmitting path of the second system.

That is, double tube elements U23 and L23 are provided respectively on the upper center shaft S1 and the lower auxiliary center shaft S2. The double tube elements U23 and L23 are composed respectively of inner tubes U24 and L24 and outer tubes U25 and L25. The inner tubes U24 and L24 are provided respectively with projecting pieces U26 amd L26 (refer to FIG. 2), while the outer tubes U25 and L25 are provided respectively with projecting pieces U27 and L27.

Figure 3:
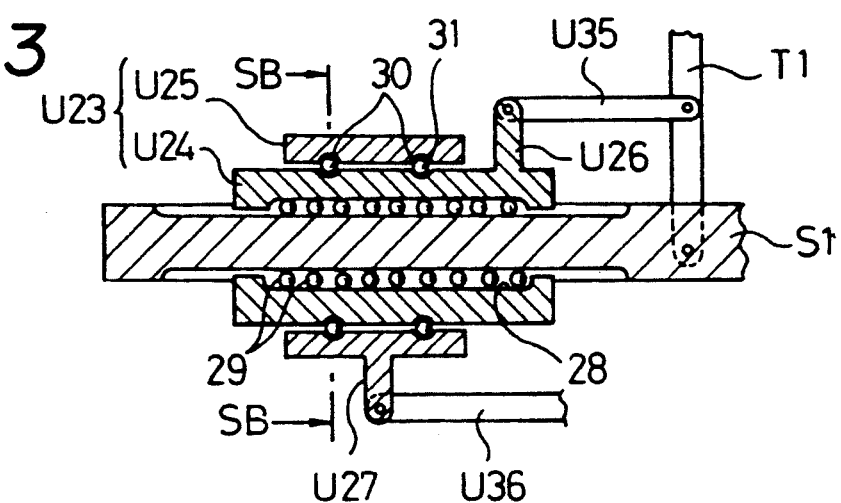
FIG. 3 is a cross-sectional view taken along a line SA—SA in FIG. 1.
Figure 4:
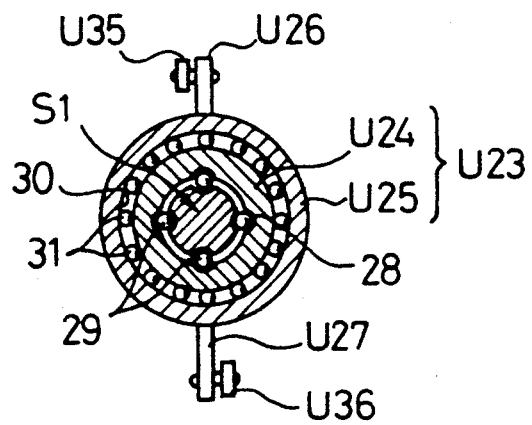
FIG. 4 is a cross-sectional view taken along a line SB—SB in FIG. 2.
Figure 5:
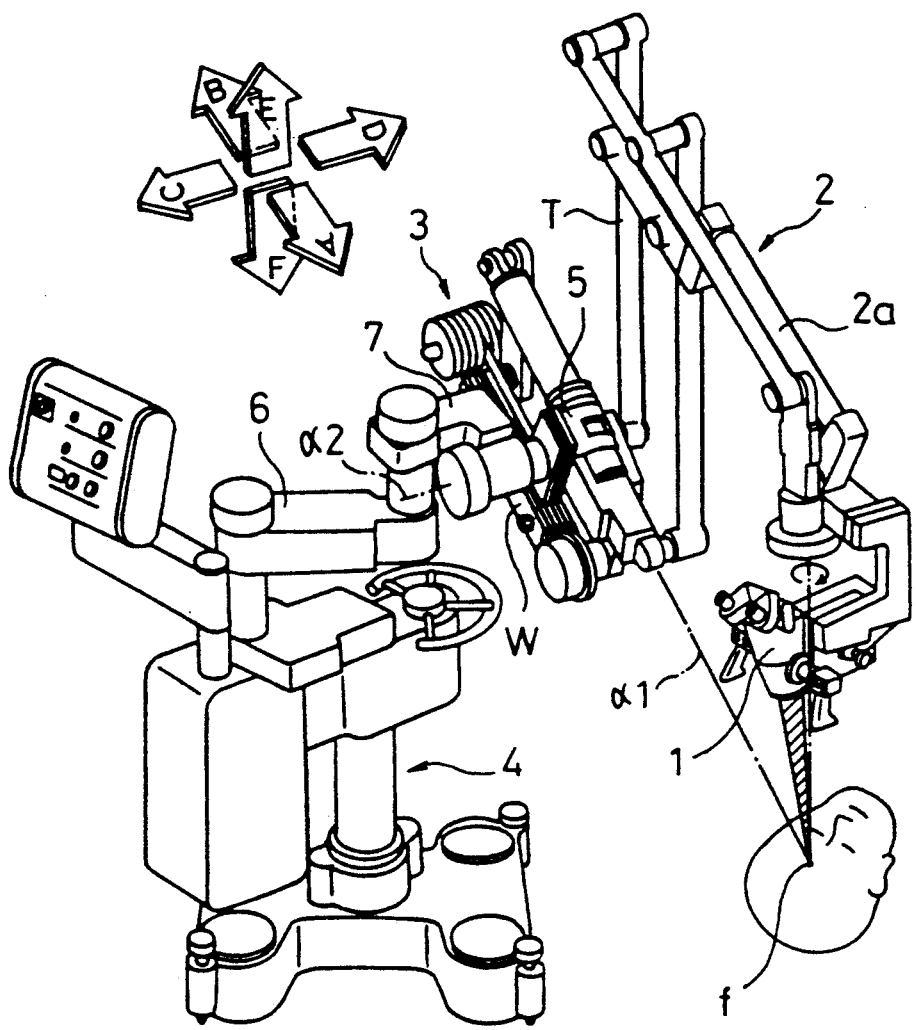
FIG. 5 is a view of an outer appearance showing an entire conventional stand apparatus of medical optical instrument.
Figure 6:
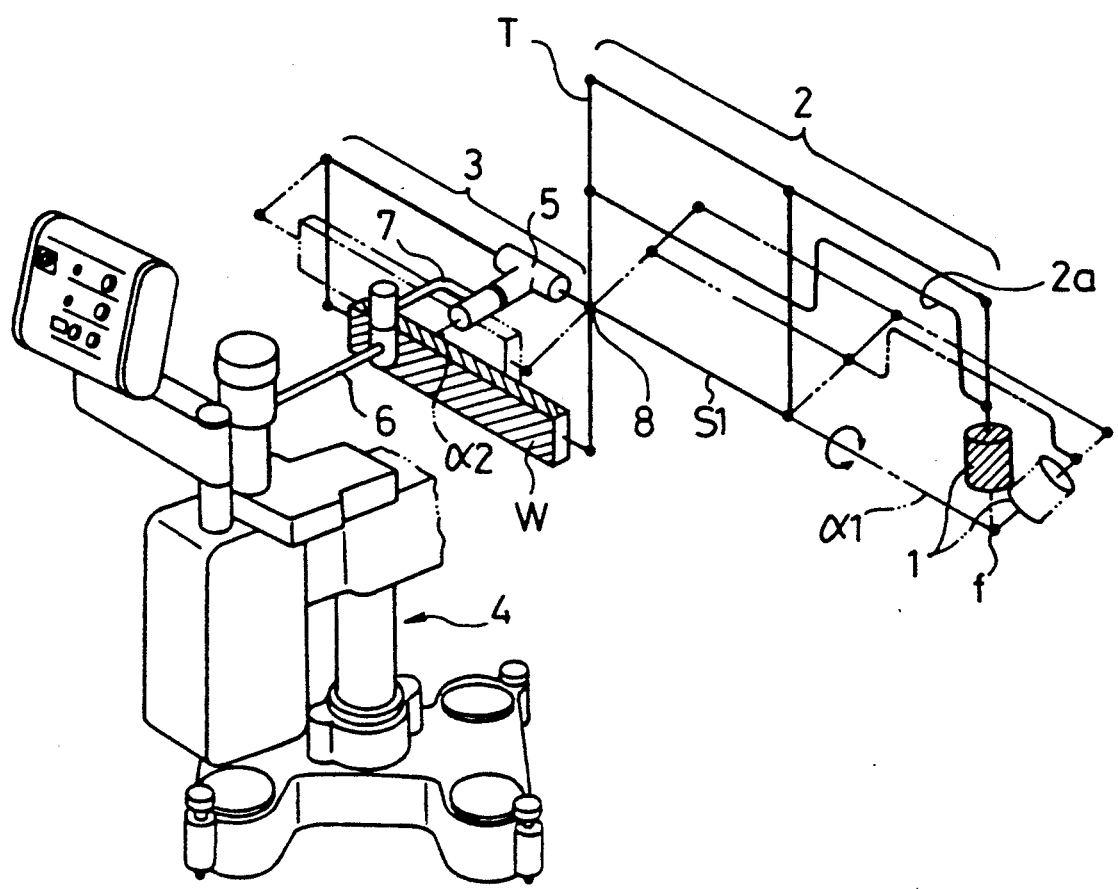
FIG. 6 is a diagram view showing a front-side parallel link mechanism and a rear-side parallel link mechanism of the conventional stand apparatus.

As shown in FIGS. 3 and 4, corresponding four (4) longitudinal grooves 28 are formed along the longitudinal direction in each of opposed surfaces between the inner tubes U24 and L24 and the center shaft S1 and the auxiliary center shaft S2. Ball bearings 29 are interposed at portions of the longitudinal grooves 28. Accordinly, the inner tubes U24 and L24 are slidable along the longitudinal direction of the center shaft S1 and the auxiliary center shaft S2, but rotational or angularly moving operation about the axis $\alpha 1$ is impossible. Further, two peripheral grooves 30 provided along the rotational or angularly moving direction are formed in each of the opposed surfaces between the outer tubes U25 and L25 and the inner tubes U24 and L24. A ball bearings 31 are interposed in the corresponding peripheral grooves 30. Accordingly, the outer tubes U25 and L25 slide in the rotational or angularly moving direction with respect to the inner tubes U24 and L24, but are incapable of sliding in the longitudinal direction. With regard to the longitudinal direction, the outer tubes U25 and L25 and the inner tubes U24 and L24 move integrally, or move together with each other.

As shown in FIG. 1, the upper bearing section U20 and the lower bearing section L20 are provided respectively with simple tube elements U32 and L32. The simple tube elements U32 and L32 are of constructions corresponding respectively to the outer tubes U25 and L25 of the respective double tube elements U23 and L23, and the slidable respectively in the rotational or angularly moving directions about the axis $\alpha 2$ and $\alpha 5$ through ball bearings (not shown). However, the simple tube elements U32 and L32 are incapable of sliding along the longitudinal directions of the respective axes $\alpha 2$ and $\alpha 5$ of the bearing sections U20 and L20. Furthermore, each of the simple tube elements U32 and L32 is provided with a pair of projecting pieces U33 and U34, L33 and L34 which are different in angle from each other through 90°.

Figure 2:
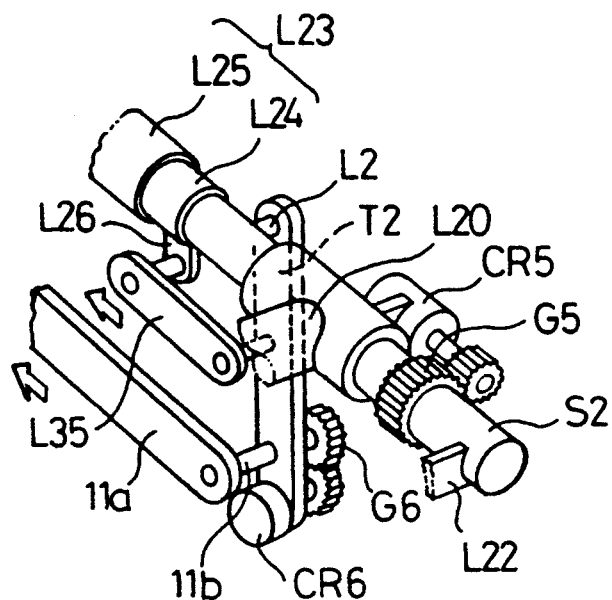
FIG. 2 is an enlarged view of a principal portion showing a portion of portions indicated by arrows DA illustrated in FIG. 1, which is not seen.

As shown in FIGS. 1 and 3, the projecting piece U26 of the inner tube U24, which is provided on the upper center shaft S1, is connected to a rear link T1 of the front-side parallel link mechanism 10 through a short lateral link arm U35. Further, the projecting piece U27 provided on the upper outer tube U25 is connected to one of the projecting pieces U34 of the simple tube element U32 provided on the bearing section U20, through an elongated lateral link arm U36. The other projecting piece U33 in the simple tube element U32 is connected to one of the projecting pieces L33 of the simple tube element L32 provided on the lower bearing section L20, through a longitudinal link arm TR2. Furthermore, the other projecting piece L34 of the simple tube element L32 is connected to the projecting piece L27 provided on the lower outer tube L25 by an elongated lateral link arm L36. As shown in FIG. 2, the projecting piece L26 provided on the inner tube L24 of the lower double tube element L23 is connected to a front link T2 of the rear-side parallel link mechanism 11 through the short lateral link arm L35. In this connection, the electromagnetic clutch CR6 is fixedly mounted on the front link T2 of the rear-side parallel link mechanism 11. The electromagnetic clutch CR6 has a gear which is under a condition that the gear is engaged with a gear G6 fixedly mounted on an angularly-movable pin 11$b$ of a bottom link 11$a$ of the rear-side parallel link mechanism 11.

Accordingly, if, for example, the front-side parallel link mechanism 10 is fallen down forwardly (in the direction indicated by the arrow A) about the fulcrums U1 and U2, the entire double tube element L23 is pulled or tensioned by the short lateral link arm U35 and slides forwardly. When the double tube element U23 moves forwardly, the elongated lateral link arm U36 is pushed forwardly so that the upper simple tube element U32 is rotated. When the upper simple tube element U32 is rotated or moved angularly, the longitudinal link arm TR2 is depressed or pushed downwardly so that the lower simple tube element L32 is rotated or moved angularly. When the simple tube element L32 is rotated or moved angularly, the elongated link arm L36 is pushed rearwardly (in the direction indicated by the arrow B) so that the lower double tube element L23 slides rearwardly. When the double tube element L23 slides rearwardly, as shown in FIG. 2, the short lateral link arm L35 connected to the double tube element L23 is also pulled rearwardly so that the front link T2 of the rear-side parallel link mechanism 11 is pulled rearwardly. Accordingly, the entire rear-side parallel link mechanism 11 is tilted rearwardly about the fulcrums L1 and L2, so that a balance between front and rear weights of the stand apparatus at the time the front-side parallel link mechanism 10 is fallen down and is deformed is kept.

Moreover, even if the rotational or angularly moving operation about the axis $\alpha 1$ indicated by the first system is executed while the front-side parallel link mechanism 10 is fallen down in this manner, the inner tubes U24 and L24 in the double tube elements U23 and L23 are slidable in the rotational or angularly moving direction with respect to the outer tubes U25 and L25 and, therefore, there is no case where breakage of the double tube elements U23 and L23 or the like is caused.

Third System

As described previously, the third system is a system for transmitting seesaw operation of the center shaft S1 about the axis $\alpha 2$, to the lower auxiliary center shaft S2, to cause the auxiliary center shaft S2 to execute similar seesaw operation about the axis $\alpha 5$. That is, the upper and lower bearing sections U20 and L20 are provided respectively with projecting pieces U37 and L37, and the projecting pieces U37 and L37 are connected to each other by a longitudinal link arm TR3. Accordingly, when, for example, a forward end of the center shaft S1 is lowered or moved downwardly, the projecting piece U37 is angularly moved upwardly (in the direction indicated by the arrow E), to raise the longitudinal link arm TR3. When the longitudinal link arm TR3 is raised, the lower projecting piece L37 is also angularly moved upwardly so that the lower bearing section L20 is moved angularly about the axis $\alpha 5$. Accordingly, the auxiliary center shaft S2 also executes seesaw operation the same as that of the upper center shaft S1. Thus, even if the center shaft S1 executes seesaw operation about the axis $\alpha 2$, a balance between front and rear weights of the stand apparatus is kept.

In this manner, the stand apparatus according to the embodiment is arranged such that, although the rear-side parallel link mechanism 11 is arranged at a lower position spaced away from the front-side parallel link mechanism 10, the rear-side parallel link mechanism 11 surely moves in the direction similar to that of the conventional arrangement, in interlocking relation to operation of the front-side parallel link mechanism 10. Accordingly, even if an operator moves the operation microscope to any locations, a balance in weight of the entire stand apparatus is kept surely or certainly. Thus, if the operator leaves or detaches his hand after the operation microscope 18 has been moved to a desired location, the operation microscope 18 is haled or suspended at the location as if the operation microscope 18 is located in a gravity-free space. Further, the location of the center of gravity of the entire stand apparatus is lowered correspondingly to the fact that the rear-side parallel link mechanism 11 is lowered less than the conventional arrangement, so that stability of the stand apparatus increases. Accordingly, if many accessories such as a camera, a video and the like, in addition to the operation microscope, are attached to the stand apparatus, a bad influence is not exerted upon stability of the stand apparatus.

Since, first of all, the rear-side parallel link mechanism 11 does not reside or is not located immediately rearwardly of the front-side parallel link mechanism 10, an upper space SP (refer to FIG. 1), which has conventionally been occupied by the rear-side parallel link mechanism 11, can be used freely. Accordingly, this is very convenient for the operator and the assistant, and operation per se becomes easy to be executed.

In connection with the above, the operation microscope has been described as an example of "Medical Optical Instrument". However, the present invention should not be limited to "Medical Optical Instrument", but the present invention can widely be applied to various kinds of medical laser instruments and the like. Further, in the embodiment, the stand apparatus is of type of a stand located on a floor. However, the same advantages can be produced if the stand apparatus is of type of a stand which is suspended from a ceiling.

The stand apparatus for the medical optical instrument, according to the invention, has the contents as described previously. Since the counterweight and the rear-side parallel link mechanism are located at their respective positions lower than those of the conventional arrangement, the rear space above the stand apparatus is not occupied by the counterweight and the rear-side parallel link mechanism, dissimilarly to the conventional arrangement. Since the operator and the assistant can freely use the rear upper space, it becomes very convenient. Furthermore, the position of the center of gravity of the entire stand apparatus is lowered considerably so that stability of the stand apparatus increases.

What is claimed is:

1. A stand apparatus for a medical optical instrument, characterized by comprising:
    a center shaft having an axis;
    an auxiliary center shaft located at a position below said center shaft;
    a front-side parallel link mechanism having the medical optical instrument and located on fulcrums;
    a rear-side parallel link mechanism having a counterweight;
    said center shaft being provided with said front-side parallel link mechanism;
    said auxiliary center shaft being provided with said rear-side parallel link mechanism; and
    a transmission mechanism having a first system and a second system,
    wherein angularly moving operation of said center shaft about said axis and longitudinal tilting operation of said front-side parallel link mechanism about said fulcrums are capable of being transmitted respectively to said auxiliary center shaft and to said rear-side parallel link mechanism, through said first system and said second system of said transmission mechanism.

2. A stand apparatus for a medical optical instrument, according to claim 1, wherein said transmission mechanism further has a third system, and wherein said transmission mechanism transmits seesaw operation of said center shaft about an axis ($\alpha 2$) of said auxiliary center shaft to said auxiliary center shaft, through said third system.

* * * * *